April 6, 1948.  F. J. JENKINS  2,439,133
COMBINED TABLE AND ELECTRICALLY HEATED HOT PLATES
Filed July 31, 1944  2 Sheets-Sheet 1
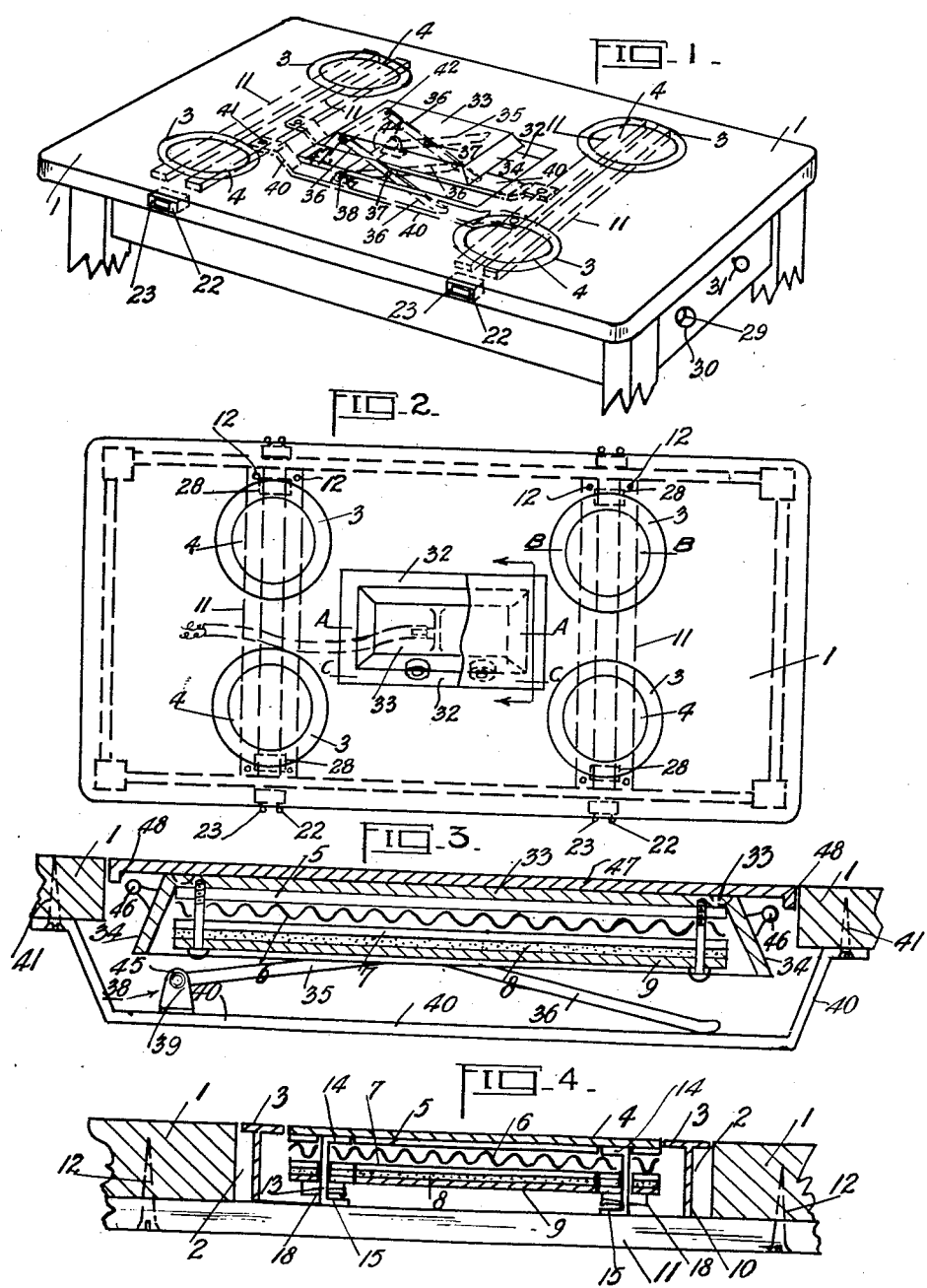
Inventor
F. J. Jenkins
By Glascock Downing Siebold
Attys

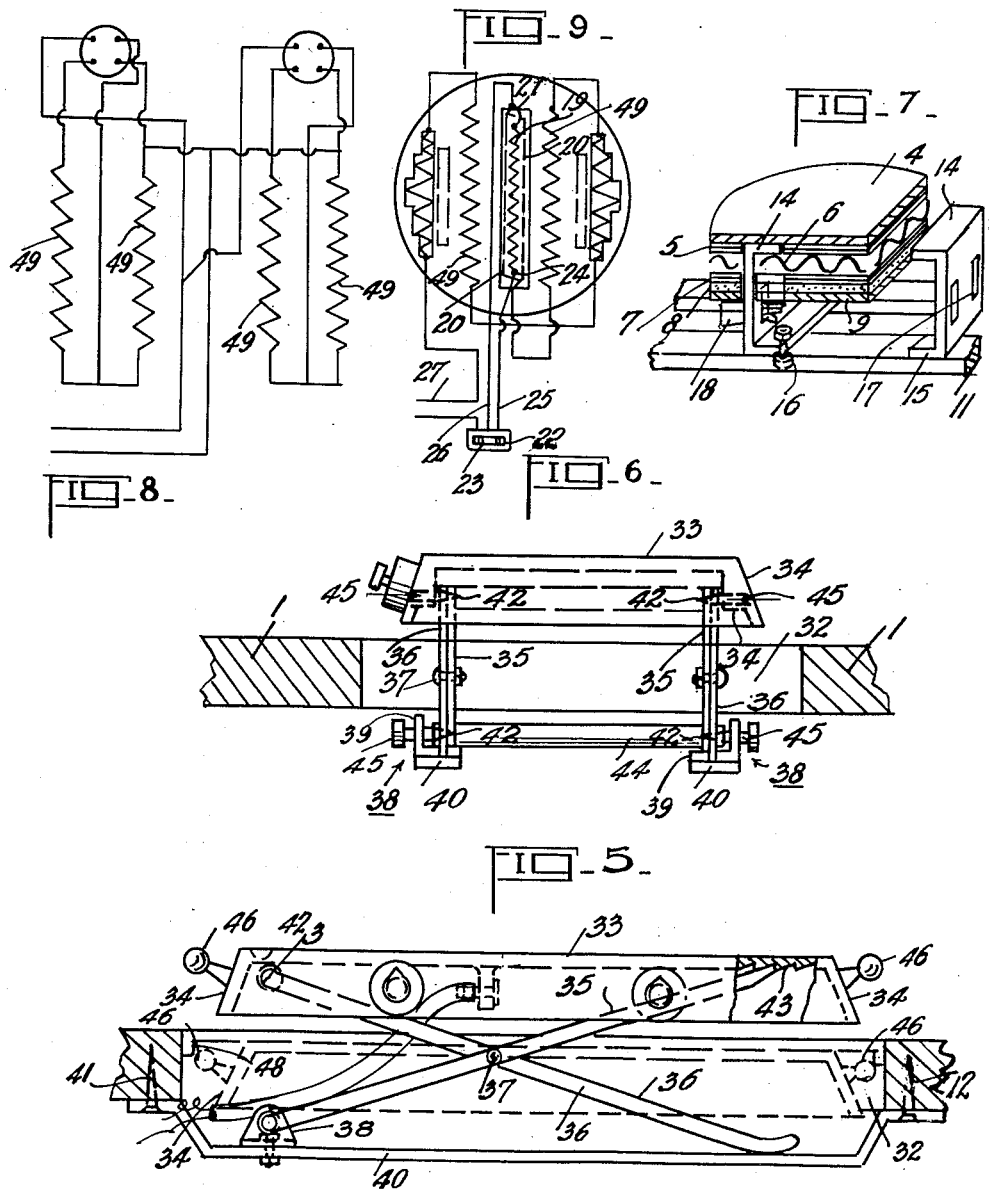

Patented Apr. 6, 1948

2,439,133

UNITED STATES PATENT OFFICE 2,439,133

COMBINED TABLE AND ELECTRICALLY HEATED HOT PLATES

Francis John Jenkins, Hurlstone Park, New South Wales, Australia

Application July 31, 1944, Serial No. 547,399½
In Australia November 11, 1943

3 Claims. (Cl. 219—19)

1

The principal object of my invention is the provision or simple and convenient means whereby the food of diners seated around a table is kept hot during the meal and whereby simple cooking may be done or water boiled for making coffee and like purposes.

According hereto a plurality of electrically heated metal plates in the form of discs herein called "hot plates" and preferably one for each person to be provided for, are disposed in recesses in the top of the table in such manner that when the plates are not being used an opening surrounding each of them may be filled by a ring which being of the same color as the plate, and also as the top of the table, makes the "hot plate" practically unobservable.

A greater heat for cooking operations and boiling water and the like, is provided for by an additional and larger "hot plate," herein called "cooking plate," and preferably of rectangular section.

The cooking plate is normally positioned below the surface of the table, is supported upon carrier bars and when required for use is raised to a desired height above the table.

An adaptation of the invention is illustrated in the accompanying drawings wherein—

Fig. 1 is a perspective view showing a table provided with four "hot plates" and a medially located cooking plate.

Fig. 2, a plan.

Fig. 3, an enlarged section on A—A of Fig. 2.

Fig. 4, an enlarged cross section on B—B, Fig. 2.

Fig. 5, a fragmentary sectional elevation on C—C, Fig. 2.

Fig. 6, an enlarged cross section on D—D, Fig. 2.

Fig. 7, a fragmentary perspective view of parts of a "hot plate."

Fig. 8, a diagram illustrating a common electrical layout appropriate for use with the cooking plate, and Fig. 9, a diagram showing an electrical unit devised for use with each of the "hot plates."

Referring first more particularly to Figs. 1 to 4.

The top 1 of a table has circular openings 2 each of which receives a removable ring 3 within which is the metal disc 4, of a "hot plate," which is heated by an electrical element consisting of superposed discs of the following materials: mica 5, resistance wire 6, mica 7, a bottom disc 8 of asbestos and a clamping plate 9.

The ring 3 is formed from synthetic resin or like material and has a circular flange 10 supported upon cross bars 11 extending across the

2 opening 2 and secured to the underside of the table by screws 12.

Metal distance pieces 13 have flanges 14—15 one at each end and extending in the same direction, flange 14 being welded to the underside of the "hot plate" while flange 15 bridges the bars 11 and is secured thereto by stud bolts 16 (see Fig. 7).

The discs 5—6—7—8 and 9 have correspondingly located openings to permit the passage of the several discs over flange 15 when the element is being assembled.

The vertical members of the distance pieces 13 have slots 17 into which are driven tapering pins 18 the ends whereof are bifurcated and are spread apart to prevent the return of the pin (see Figs. 4 and 7).

Each of the several "hot plates" is associated with elements shown in Fig. 9 whereby the "hot plate" may be brought to either a moderate or a high temperature, in both cases the "hot plate" being evenly heated over its entire area.

The special feature which enables this to be done is the employment of an additional element 19 located beneath element 20 and connected thereto element 20 by the wire 21.

A switch has two controls 22 and 23, control 22 being joined to element 19 at 24 by the wire 25 and control 23 joined to wire 21 by the wire 26, by this means the element 19 is rendered operative with control 22 on, and inoperative when control 23 is on, the heat of the unit therefore varying accordingly.

An earth wire 27 is connected to each metal component and returns to the insulated conduit through which current passes from the main to the switch.

A cover box 28 containing a porcelain connector for each "hot plate" is secured to the clamping plate 9 (Fig. 4).

A fuse employed in connection with each of the resistance coils is located in the box 28 fixed to the plate 9.

It will be understood that this arrangement is employed in connection with each of the several "hot plates."

A pilot light 29 located at one end of the table is illuminated by current passing to the element of any of the "hot plates" and is visible through a window 30.

A main control switch 31 is fixed to the frame of the table.

Referring now to Figs. 3—5 and 6 which illustrate the cooking plate in detail.

The table has a relatively large rectangular opening 32 wherethrough may be raised and lowered the cooking plate 33 which is heated by any usual electrical heating element, for example such as that shown at 49, Fig. 8, which being of common practise will be readily understood by electricians without detailed description.

Plate 33 has an integral surrounding outwardly inclined flange 34 and is carried upon two sets of arms 35—36 which are located alongside each other and arranged in pairs each comprising what is generally called a "lazy tong."

The members 35 and 36 of the several pairs of arms are pivotally connected at 37 while the lower ends of each of the arms 35 are severally hinged at 38 to brackets 39 bolted to bearer bars 40 extending across the opening 32 of the table and secured by screws 41 to the bottom thereof.

The upper end of arm 36 of each pair is pivotally connected at 42 to lugs 34 upon the underside of 33 while the lower end of each of them is bent upwardly to run upon the top of its associated bearer bar (Fig. 3).

When the cooking plate is raised through opening 32 the upper ends of the arms 35 each engage in one or other of a series of rack teeth 43 two sets whereof are formed in or fixed to the underside of plate 33.

The lower ends of members 35 of each of the respective pairs of arms are connected by a cross bar 44 and a set screw 45 which screws through bracket 38 has a point which passes into a corresponding recess in the end of bar 44. The cross bar is thus supported by a set screw at each end and an adjustable hinge bearing for the arms thereby provided.

For lifting the cooking plate handles 46 are fixed to opposite ends of the flange 34 and when the plate 33 has descended, by being pushed down or otherwise, through the opening 32 into the position shown in dotted lines Fig. 5 the opening may be covered by a removable plate 47 having a small guide flange 48.

The plate 47 may be readily removed by pressure upon one of its ends.

I claim:

1. Improvements in means for keeping food hot after being served and during consumption of the meal, comprising a table top having openings to receive a plurality of heating units one for each diner, a medially disposed cooking unit also received in an opening in the said table top, pairs of longitudinal bars and pairs of cross bars all secured to the underside of the said table top, said pairs of cross bars having a pair of channel members secured thereto, said channel members carrying the said heating units each of which comprises a hot plate, a clamping plate between which mica sheets and a resistance wire and a sheet of asbestos are secured, the said cooking unit being mounted upon the said longitudinal bars.

2. Improvements in means for keeping food hot after being served and during consumption of the meal, comprising a table top having openings to receive a plurality of heating units one for each diner, a medially disposed cooking unit also received in an opening in the said table top, pairs of cross bars and pairs of longitudinal bars all secured to the underside of the said table top, said heating units being mounted upon the said cross bars and the said longitudinal bars supporting a cooking unit comprising a cooking plate having a flange, mica sheets between which a resistance wire is disposed, an asbestos sheet beneath the lower mica sheet and a clamping plate secured to the cooking plate.

3. Improvements in means for keeping food hot after being served and during consumption of the meal, comprising a table top having openings to receive a plurality of heating units one for each diner, a medially disposed cooking unit also received in an opening in the said table top, pairs of cross bars and pairs of longitudinal bars all secured to the underside of said table top, said heating units being mounted upon the said cross bars, the said cooking plate being mounted upon the said longitudinal bars by means of two sets of arms pivoted centrally, said arms being pivotally connected at one end respectively to the cooking plate and a member carried by the said bars, the free ends of the said two sets of pivoted arms being engaged respectively with ratchet teeth carried by the said cooking plate, and with the said bars upon which they slide in such manner that the cooking plate may be raised above the said table top or surface.

FRANCIS JOHN JENKINS.

REFERENCES CITED

The following references are of record in the file of this patent:

UNITED STATES PATENTS

| Number | Name | Date |
|---|---|---|
| 1,348,648 | Kelly | Aug. 3, 1920 |
| 1,731,949 | Span et al. | Oct. 15, 1929 |
| 2,025,252 | Stencell | Dec. 24, 1939 |
| 2,247,974 | Thomblethorpe | July 1, 1941 |
| 2,259,143 | Shroyer | Oct. 14, 1941 |